United States Patent [19]
Sato et al.

[11] Patent Number: 5,739,930
[45] Date of Patent: Apr. 14, 1998

[54] DISPLAY APPARATUS

[75] Inventors: Noriko Sato; Hirokazu Aritake; Masayuki Kato; Manabu Ishimoto, all of Kawasaki, Japan

[73] Assignee: Fujitsu Limited, Kawasaki, Japan

[21] Appl. No.: 576,164

[22] Filed: Dec. 21, 1995

Related U.S. Application Data

[63] Continuation of Ser. No. 135,480, Oct. 13, 1993, abandoned.

[30] Foreign Application Priority Data

Oct. 13, 1992 [JP] Japan .................. 4-274023

[51] Int. Cl.$^6$ .................. G03H 1/26; G03H 1/08; G02B 5/32
[52] U.S. Cl. .................. 359/23; 359/9; 359/22; 359/15
[58] Field of Search .................. 359/9, 15, 21, 359/22, 56, 57, 59

[56] References Cited

U.S. PATENT DOCUMENTS

| | | | |
|---|---|---|---|
| 3,890,035 | 6/1975 | Takeda | 359/21 |
| 4,818,078 | 4/1989 | Mouri et al. | 359/56 |
| 4,969,700 | 11/1990 | Haines | 359/9 |
| 5,117,296 | 5/1992 | Hoebing | 359/21 |
| 5,119,214 | 6/1992 | Nishii et al. | 359/9 |
| 5,128,782 | 7/1992 | Wood | 309/48 |

FOREIGN PATENT DOCUMENTS

| | | |
|---|---|---|
| 0 449 164 | 10/1991 | European Pat. Off. |
| 34 42 796 | 6/1985 | Germany |
| 62-209992 | 9/1987 | Japan |
| 64-84993 | 3/1989 | Japan |
| WO 91/10170 | 7/1991 | WIPO |

OTHER PUBLICATIONS

Patent Abstracts of Japan, vol. 13, No. 312 (E-788), Jul. 17, 1989.

*Primary Examiner*—Paul M. Dzierzynski
*Assistant Examiner*—Audrey Chang
*Attorney, Agent, or Firm*—Staas & Halsey

[57] ABSTRACT

In a display section, a plurality of pixels of minimum display units to display a hologram phase distribution are arranged to thereby construct a cell to display one pixel of a 2-dimensional image, and cells are further two-dimensionally arranged to thereby construct a display image plane. 2-dimensional image data and hologram phase distribution data from an input section are given to a display data forming section. Corresponding 2-dimensional image data and a hologram phase distribution are displayed in a display region of a display section, thereby producing hologram data for allowing a solid image to be recognized by the optical wave front conversion. A display control section executes a display control for allowing the 2-dimensional image data and hologram data from the display data forming section to be displayed in the display section. The 2-dimensional image data and hologram data are commonly managed and produced by the same data format of the cell unit including the image kind, display region, and display data in the region.

24 Claims, 22 Drawing Sheets

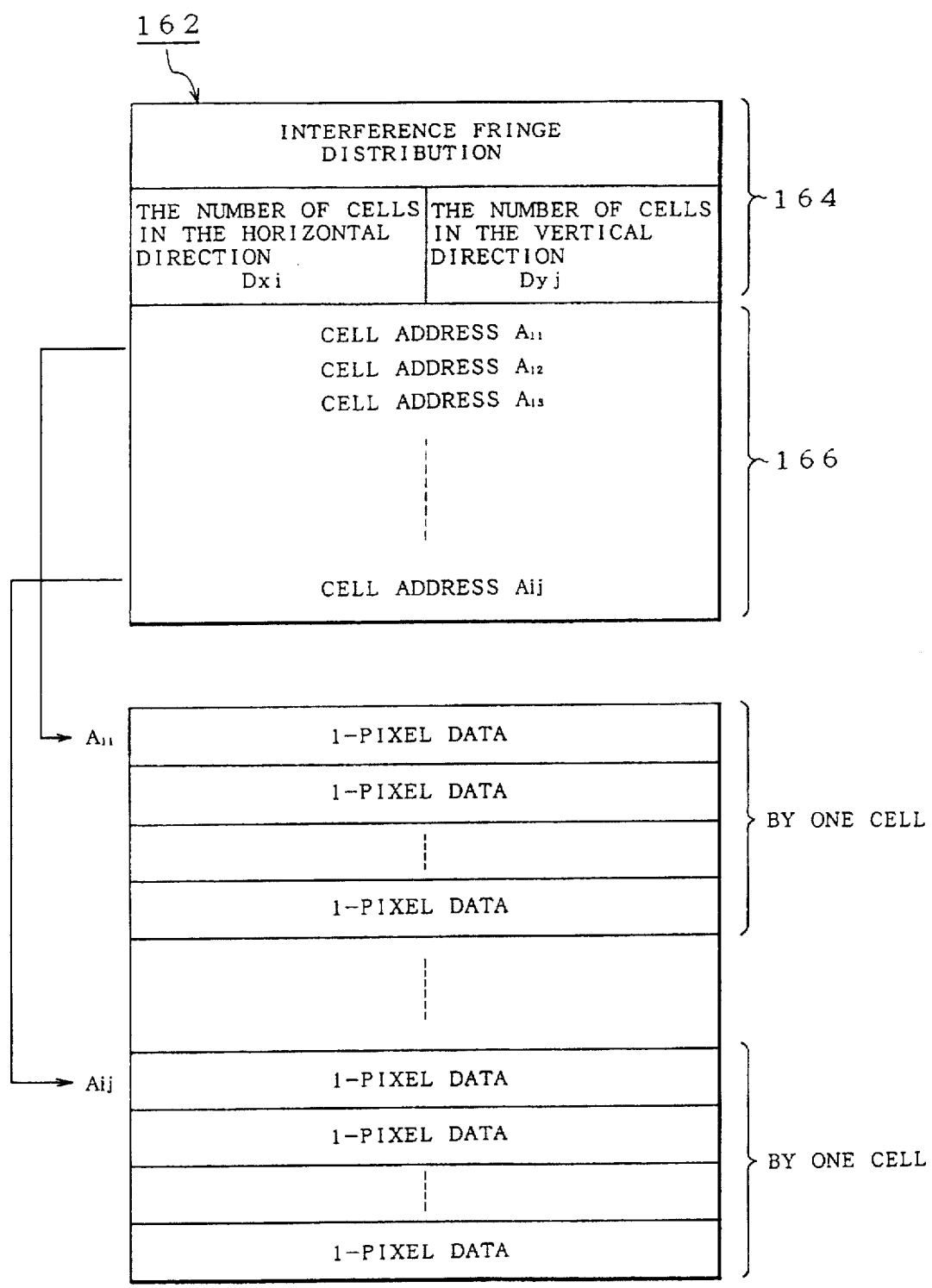

WHEREIN, $D_{00}=D_{01}=D_{02}=\cdots=D_{K1}$

FLAG   PIXEL DATA

FLAG   DATA LENGTH   INTERFERENCE FRINGE DATA

WHEREIN, $D_{00}=D_{01}=D_{02}=\cdots=D_{K1}$

5,739,930

DISPLAY APPARATUS

This application is a continuation of application Ser. No. 08/135,480, filed Oct. 13, 1993, now abandoned.

BACKGROUND OF THE INVENTION

The invention relates to a display apparatus for displaying a calculated hologram phase distribution and for allowing a solid image to be recognized by an optical wave front conversion and, more particularly, to a display apparatus for enabling a 2-dimensional image and a hologram solid image to be displayed by the same display.

When a stereoscopic image display is performed, a 3-dimensional shape of an object can be visually understood. Therefore, it is effective to display an object having a complicated shape for example. Various kinds of uses are considered for the stereoscopic image display from a viewpoint of a high resolution. Hitherto, many studies have been executed with respect to a display method of enabling a target to be stereoscopically seen. Among them, according to the display of a solid image by a hologram, since waves of light are reconstructed, a solid image can be displayed with a high resolution. In the stereoscopic display by a hologram, there has also been proposed a hologram display apparatus such that phase information of an object to be displayed is obtained by a computer and a phase distribution is displayed on a liquid crystal display, thereby allowing a solid image to be seen by the optical wave front conversion of a reference light (refer to JP-A-64-84993). By using such a display apparatus of a solid image, the solid image can be provided as information to the user.

In the case of providing stereoscopic image information by using the hologram display apparatus, not only the stereoscopic image information but also the 2-dimensional display information such as text information and 2-dimensional image information are provided together with the stereoscopic image information in many cases. As an apparatus for performing the 2-dimensional image display and the stereoscopic display, there has been proposed an apparatus for switching the 2-dimensional image display and the 3-dimensional image display in a 3-dimensional display apparatus using a Lenticular lens (refer to JP-A-62-209992). According to such an apparatus the 3-dimensional display and the 2-dimensional display are realized by the switching of a 2-dimensional image but both of a solid image and a 2-dimensional image cannot be displayed simultaneously. In the hologram display apparatus, both of a solid image and a 2-dimensional image cannot be displayed by using the same display because the amount of data of a hologram phase distribution which is used in the stereoscopic display is extremely large display resolutions of display devices which are necessary for the 2-dimensional image display and the hologram display are different.

SUMMARY OF THE INVENTION

According to the present invention, a display apparatus which can simultaneously display both of a 2-dimensional image and a solid image by using the same display is provided. In a display section of the invention, first, a plurality of pixels as minimum display units to display a hologram phase distribution are arranged, thereby constructing a cell to display one pixel of a 2-dimensional image. Further, by 2-dimensionally arranging the cells, a display screen is constructed. Image information to display the 2-dimensional image and hologram information which is used for the stereoscopic display which are inputted from an input section are supplied to a data forming section. On the basis of the inputted image information and hologram information, the data forming section produces 2-dimensional display data and hologram display data together with corresponding display control data. On the basis of the data produced by the display data forming section, a display control section drives a display section and displays a 2-dimensional image onto a display screen and, at the same time, displays the hologram information, for example, phase information, thereby allowing a solid image to be recognized by an optical wave front conversion of a reference light.

Specifically, the display data forming section comprises: a display data memory section, a control data memory section; and a data managing section. The display data memory section separately stores the 2-dimensional image information and hologram information for every image. The control data memory section stores display control data to manage at least a display region in the 2-dimensional image information and the hologram information, which were separately stored for every image. The data managing section, further, reads out the 2-dimensional image information and the hologram information from the display data memory section and produces the 2-dimensional display data and hologram display data of a predetermined display unit and generates together with the corresponding display control data which was read out from the control data memory section. The kind of image and the display region are stored as display control data. According to the present invention, since both of the 2-dimensional image and the hologram information are displayed and controlled on a cell unit basis, the display region is defined by the number of cells. Practically, the coordinate values at the left upper corner of the display region, the number of cells, the size which is indicated by the numbers of cells in the horizontal and vertical directions, and the display start coordinates in the region are prepared.

Although the 2-dimensional image data has been stored every image, the display data which is supplied to the display is produced on a cell unit basis. A producing format of the display data is set to a group of a flag indicative of the kind of image and the data of a plurality of pixels constructing one cell. Specifically, the 2-dimensional display data is set to a group of a flag indicative of the 2-dimensional image and the pixel data of one cell having the same value. The hologram display data is set to a group of a flag indicative of hologram information and the hologram information of one cell having a peculiar value.

For example, the display section is constructed by a liquid crystal display using a TN liquid crystal and displays a 2-dimensional image by a change in amplitude of the light and displays a phase distribution as hologram information by a change in phase of the light. A hologram phase distribution formed by the liquid crystal display converts a reference light into a wave front, thereby allowing a solid image to be recognized.

According to such a display apparatus of the invention, a set of a plurality of pixels which are used in the stereoscopic image display is handled as a cell indicative of one pixel of a 2-dimensional image. The pixel corresponds to the minimum unit and realizes a resolution enough to express the hologram information such as a phase distribution or the like and to stereoscopically display a solid image. Since the display of a 2-dimensional image and the display of a hologram phase distribution of different resolutions are executed on a cell unit basis, a format of the display data and control data of the 2-dimensional image and a format of the display data and control data of a stereoscopic image are set to a common format, an arbitrary display region on the screen is designated, and the switching between the display of the 2-dimensional image and the display of a solid image can be integratedly executed.

The above and other objects, features, and advantages of the present invention will become more apparent from the following detailed description with reference to the drawings.

BRIEF DESCRIPTION THE DRAWINGS

FIG. 9 is an explanatory diagram of a storing format of interference fringe data in the image data frame buffer;

DETAILED DESCRIPTION OF THE PREFERRED EMBODIMENTS

Figure 1:
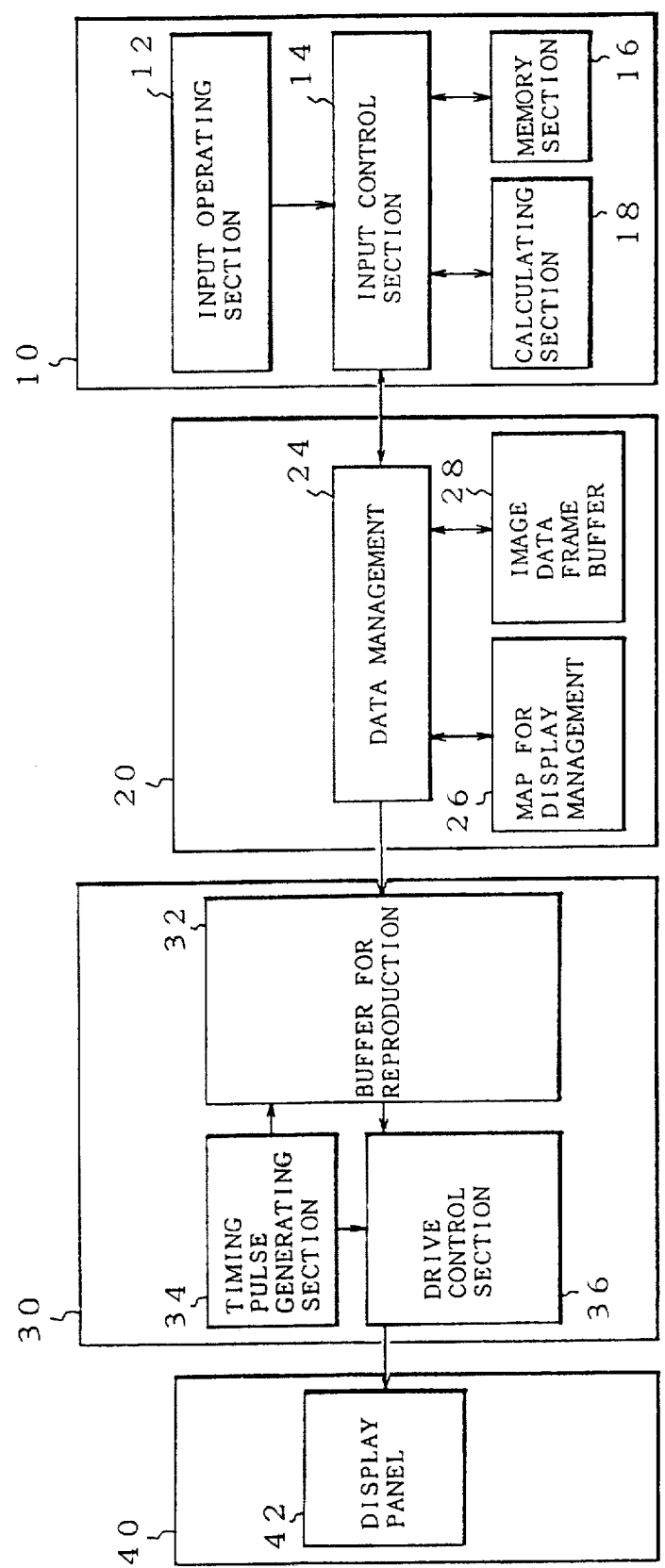
FIG. 1 is a block diagram showing an embodiment of the invention.

FIG. 1 shows an embodiment of the invention. A display apparatus of the invention is constructed by an input section 10, a display data forming section 20, a display control section 30, and a display section 40. The input section 10 comprises an input operating section 12, an input control section 14, a memory section 16, and a calculating section 18. The input operating section 12 denotes a keyboard or a mouse and is used for the operator to give a command for display control. The input control section 14 is constructed by a computer, and inputs 2-dimensional image information and hologram information to the display data forming section 20. The 2-dimensional image information and hologram information to be inputted to the display data forming section 20 have been stored in the memory section 16. Further, 3-dimensional object information which is used in the calculation of the hologram information has been stored in the memory section 16. The calculating section 18 calculates hologram information, for example, a hologram phase distribution from the 3-dimensional object information stored in the memory section 16 and stores the result of the calculation into the memory section 16 as hologram information.

The display data forming section 20 comprises a data managing section 24, a map 26 for display management, and an image data frame buffer 28. The map 26 for display management has a function as a memory section of display control data. A display region on a display screen and control data regarding a priority display or the like in the case where images overlap and the like have been stored every image in the map 26. The image data frame buffer 28 functions as display data memory means. dimensional image data and hologram information for stereoscopic display such as hologram phase distribution data (interference fringe data) have been stored every image in the image data frame buffer 28. In response to the designation of the image number, the data managing section 24 reads out the display control data corresponding to the designated image number from the map 26. The data managing section 24 also reads out the 2-dimensional display data or hologram display data from the image data frame buffer 28 and produces the corresponding display data and supplies to the display control section 30, respectively.

The display control section 30 comprises a buffer 32 for reproduction, a timing pulse generating section 34, and a drive control section 36. Display data of one cell which is used for display of one image plane is stored into the buffer 32. The timing pulse generating section 34 generates a timing pulse at a predetermined period. The drive control section 36 reads out the corresponding display control data from the buffer 32 in response to each timing pulse and drives a display panel 42 provided in the display section 40. At the same time, the drive control section 36 reads out the corresponding data for display, that is, 2-dimensional display data or hologram display data and supplies a display signal to the pixels in the selected cell.

Figure 2:
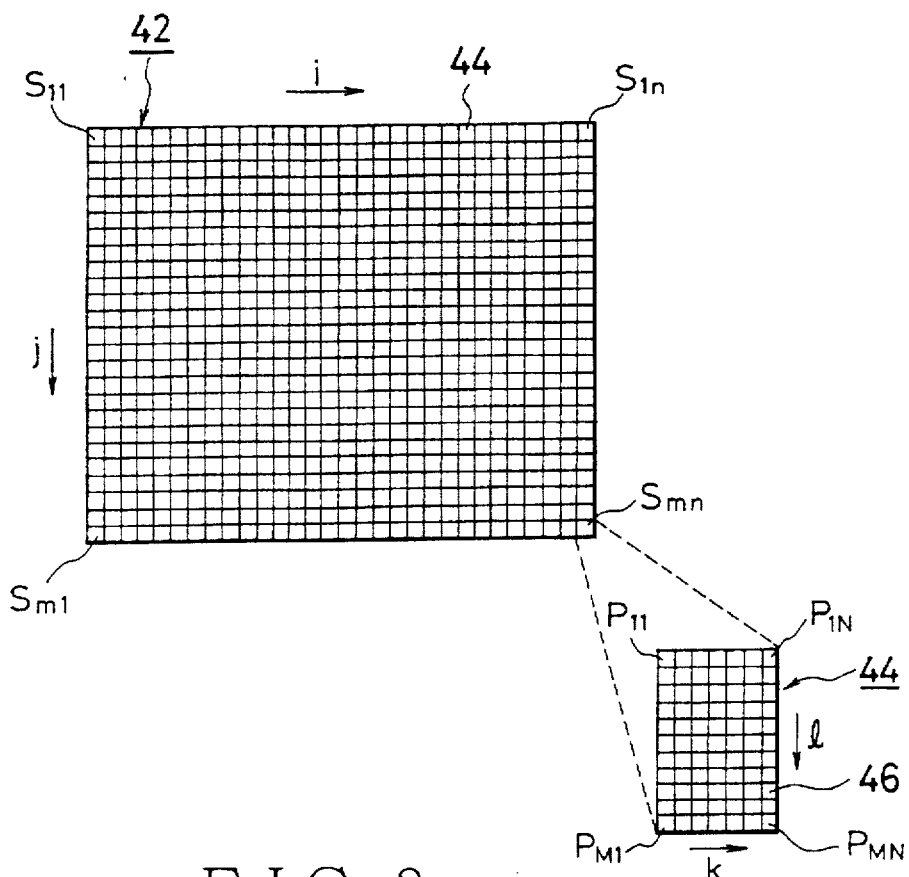
FIG. 2 is an explanatory diagram of a display section of the invention.

FIG. 2 shows a fundamental structure of the display panel 42 which is provided in the display section 40 in FIG. 1 and is used in the invention. The display panel 42 has a function for displaying a 2-dimensional image in a manner similar to the ordinary display simultaneously with the display of a phase distribution for stereoscopic display. In order to display a phase distribution (interference fringe distribution) as hologram information for stereoscopic display, a micro pixel size near a value on the order of a wavelength λ of a reference light is needed. On the other hand, to display a 2-dimensional image, it is sufficient to set a pixel size to a value which is enough smaller than a resolution of the human eyes. Even in case of seeing the pixel from the position that is away from the pixel by 30 cm, a pixel size of 0.1 mm is ordinarily sufficient. Each of cells 44 divided in a matrix form on the display panel 42 has a size of a square of, for example, 0.1 mm having a resolution necessary for display of a 2-dimensional image. The cell 44 which is used as one pixel of the 2-dimensional image is, further, constructed by a set of micro pixels 46 as shown in the cell at the right lower corner. The pixel 46 is used to display a phase distribution for stereoscopic display and has a size of a micron order near the order of the wavelength of the reference light.

With respect to the cell 44 shown in the display panel 42, the horizontal direction is indicated by the number of (i) and the vertical direction is indicated by the number of (j). Now, assuming that i=1 to n and 3=1 to m, each cell region can be expressed by $S_{11}, S_{12}, \ldots, S_{mn}$. On the other hand, with respect to the pixel 46 shown in the cell 44 indicated by the region $S_{mn}$ at the right lower corner, the horizontal direction is shown by (k=1 to N) and the vertical direction is shown by (l=1 to M). Thus, the region of the pixel 46 can be expressed by $P_{11}, P_{12}, \ldots, P_{MN}$. A detailed structure of the display panel 42 of the invention shown in FIG. 2 will be further explained hereinlater.

Figure 3:
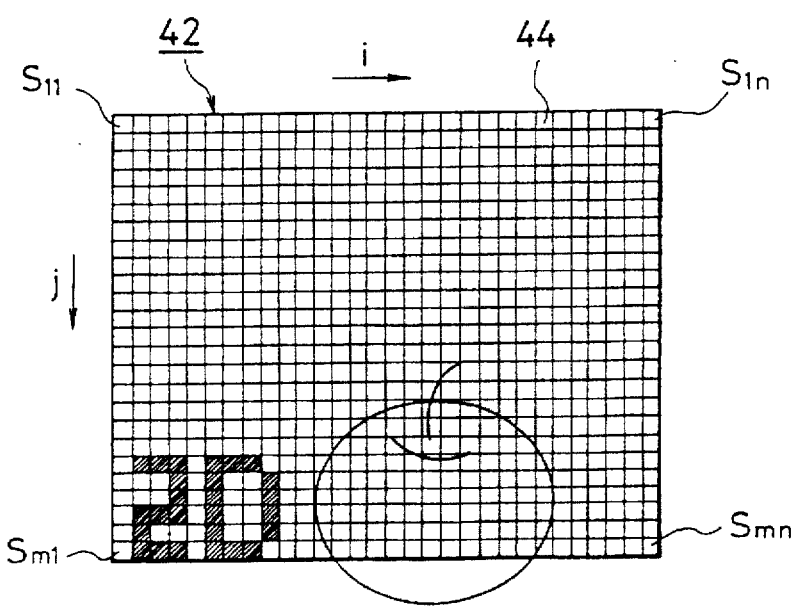
FIG. 3 is an explanatory diagram showing a state of the simultaneous display of a 2-dimensional image and a solid image by the display section of the invention.

FIG. 3 shows a state in which both of the 2-dimensional image and the solid image are simultaneously displayed by using the display panel 42 in FIG. 2.

A method of calculating hologram information by the calculating section 18 provided in the input section 10 in FIG. 1 will now be described. First, the principle of a hologram will be described. One laser beam is divided into two beams and one of the beams is irradiated to an object, by which a laser beam (object light) is scattered. A hologram is obtained by an interference of two light fluxes of the laser beam (object light) and the other laser beam (reference light). Now, assuming that a wave front of the reference light is set to $R.\exp(j\phi_r)$ and a wave front of the object light is set to $O.\exp(j\phi_o)$, an exposing intensity $I_H$ of the hologram is $$I_H = R^2 + O^2 + 2.R.O.\cos(\phi_o - \phi_r) \tag{1}$$

In case of forming a hologram by the development of a dry plate which was interference exposed, changes in amplitude and phase which are proportional to the exposing intensity $I_H$ in the equation (1) occur in the hologram. To electrically form a hologram, it is sufficient to use a space light modulating device such as a liquid crystal device or the like which can change the amplitude or phase of the light. By inputting the same wave front as that of the reference light to the hologram formed as mentioned above, a hologram can be reconstructed.

In the exposing intensity $I_H$ of the equation (1), since only the third term of the right side contributes to the reconstruction of the object light, the third term of the right side will now be considered. A transmission light T from the hologram is $$\begin{aligned}T &= I_H \cdot R \cdot \exp(j\phi_r) \\ &\propto 2 \cdot R \cdot O \cdot \cos(\phi_o - \phi_r) \cdot \exp(j\phi_r) \\ &= O \cdot \exp(j\phi_r) + O \cdot \exp\{-j(\phi_o - 2\phi_r)\}\end{aligned} \tag{2}$$

The first term of the right side of the equation (2) indicates that the wave front from the object was reconstructed. The second term of the right side indicates a conjugate wave of the object light. From the above description of the principle, to calculate a phase distribution of a hologram, it is sufficient to calculate only the third term of the right side.

Figure 4:
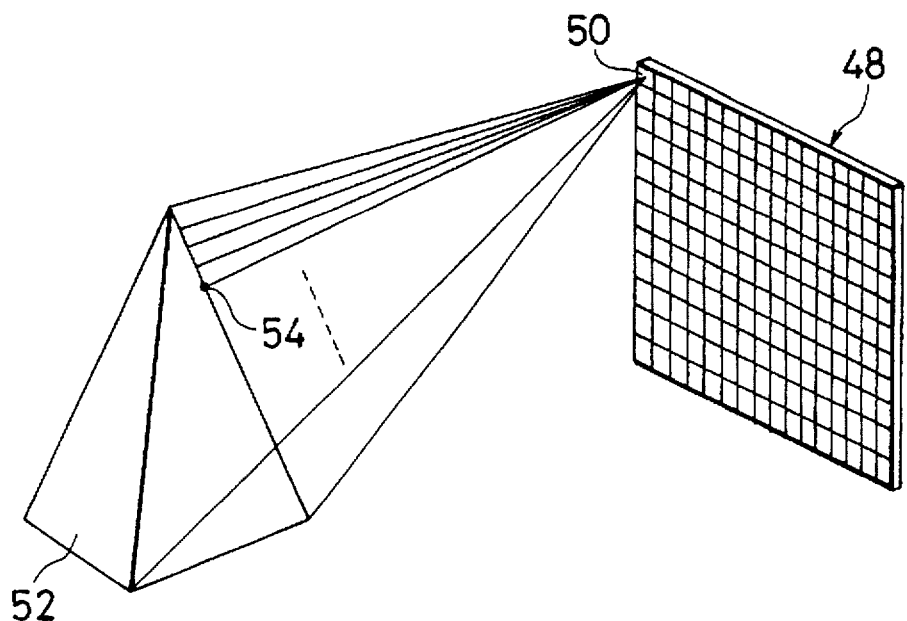
FIG. 4 is an explanatory diagram of the phase calculation of a Fresnel type hologram.

FIG. 4 shows a principle of the formation of a Fresnel type hologram. It is now considered that the reference light is constructed by a plane wave, since an intensity of plane wave is not changed in dependence on the location, a light intensity R can be ignored and a phase can be regarded as $\phi_r=0$. Now, assuming that a luminance (scattering degree) of a sampling point 54 having coordinates $(X_i, Y_i, Z_i)$ of an object 52 is set to $I_i$, the exposing intensity $I_H$ at a certain point (pixel region) 50 on the hologram forming surface 48 is $$I_H = \sum_i \{(I_i/r) \cdot \cos(k \cdot r)\} \tag{3}$$

where, k indicates the number of k of the laser beam $$r = \sqrt{\{(X_i - X_{ki})^2 - (Y_i - Y_{ki})^2 + Z_1^2\}} \tag{4}$$

Figure 5:
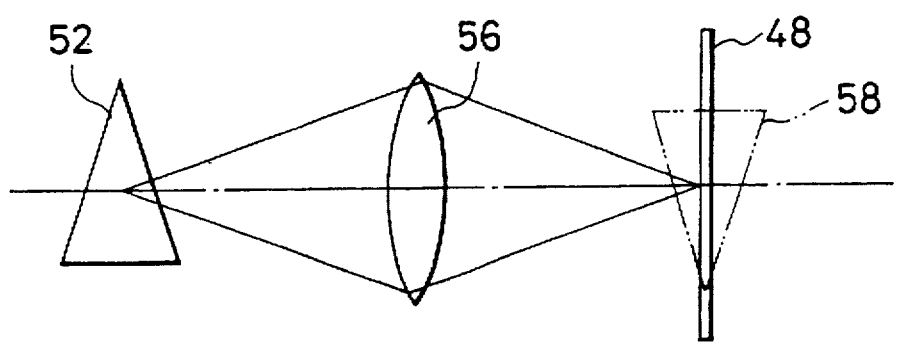
FIG. 5 is an explanatory diagram of a principle to form an image type hologram.
Figure 6:
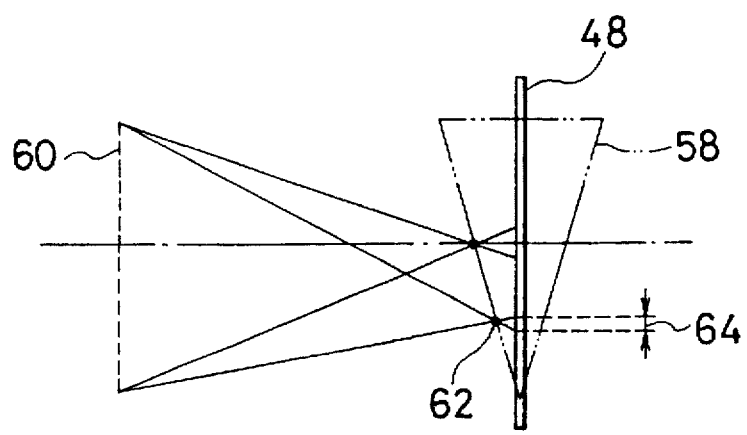
FIG. 6 is an explanatory diagram of the phase calculation of an image type hologram.

In case of the Fresnel type hologram shown in FIG. 4, since the light from the object 52 reaches the whole program, it is necessary to execute the calculations of the equations (3) and (4) for the whole region of the hologram forming surface 48. On the other hand, in case of an image type hologram shown in FIG. 5, an image of object 52 is formed as a real image 58 at a position of the hologram forming surface 48 by an image forming lens 56. Therefore, as shown in FIG. 6, when a sampling point 62 of the image 58 is seen, for example, the light reaches only a range of a region 64 of the hologram forming surface 48 which is determined by a virtual opening 60. A region to execute the calculations of the equations (3) and (4) is limited.

Figure 7:
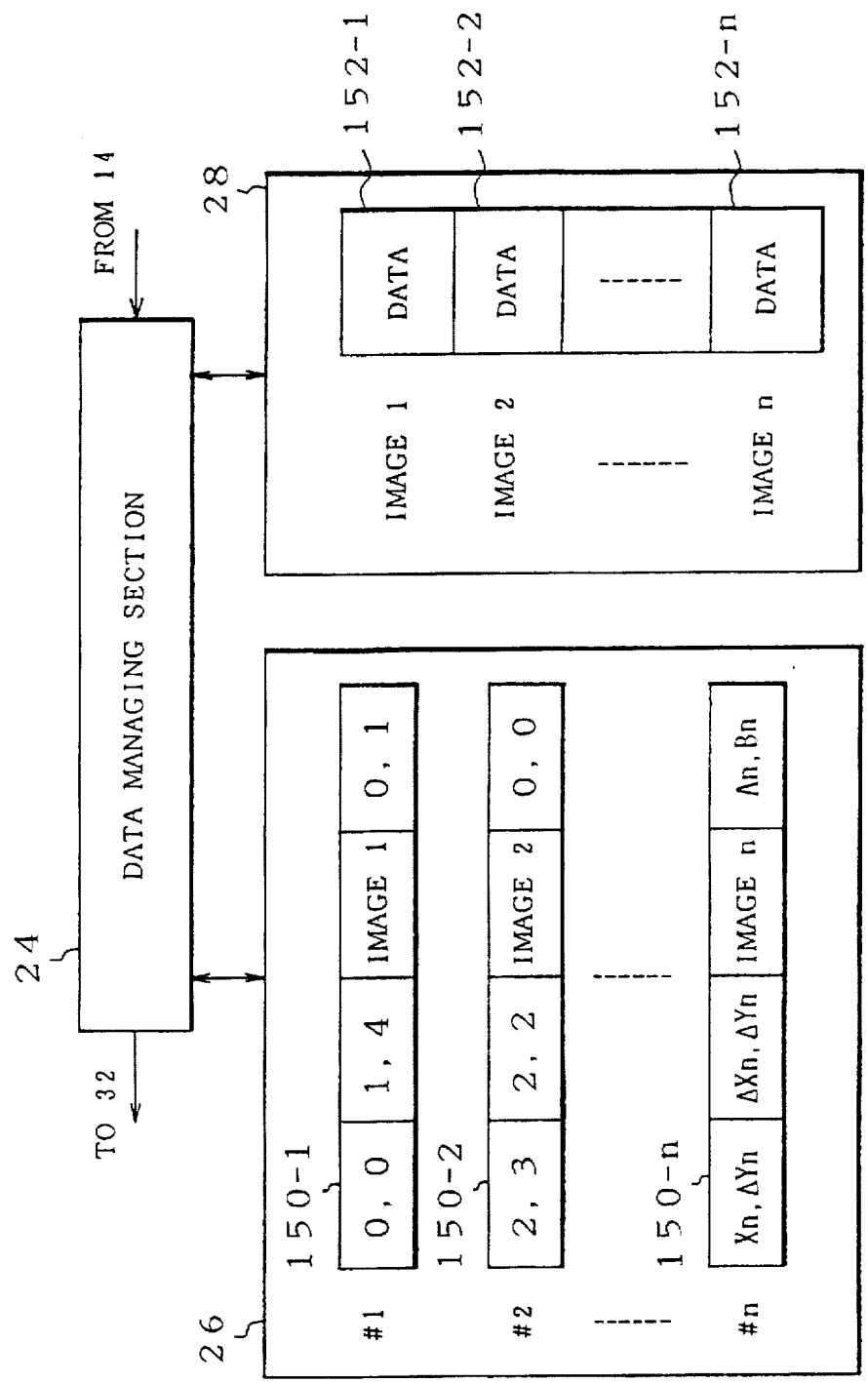
FIG. 7 is an explanatory diagram of a display data forming section.

FIG. 7 shows the details of the display data forming section 20 shown in FIG. 1. Management data 150-1, 150-2, ..., 150-n including the display control data have been stored in the map 26 for display management for each of the image numbers #1, #2, ..., #n. Data 152-1, 152-2, ..., 152-n have been stored in the image data frame buffer 28 in correspondence to images 1, 2, ... n included in the management data 150-1 to 150-n.

Figure 8:
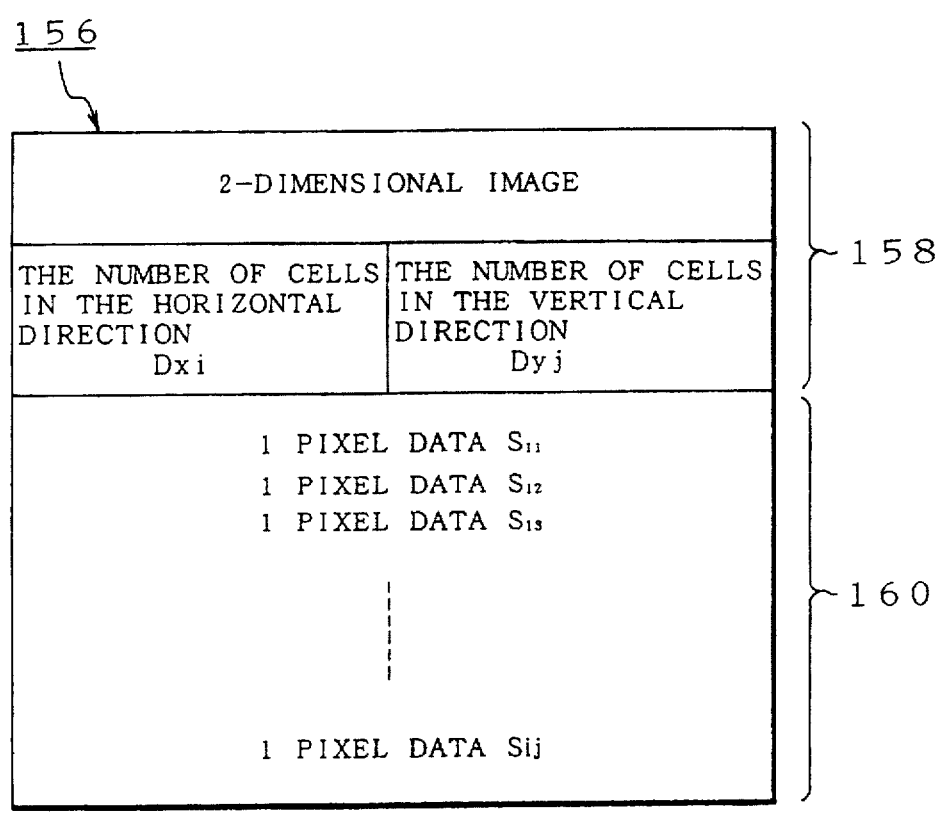
FIG. 8 is an explanatory diagram of a storing format of 2-dimensional image data in an image data frame buffer.

FIG. 8 shows a data format of 2-dimensional image data stored in the image data frame buffer 28. The 2-dimensional image data 156 which is stored into the buffer 28 is constructed by a header portion 158 and a body portion 160. Information indicative of a 2-dimensional image is stored as image kind information into the header portion 158. Such information is expressed by the number $DX_i$ of cells in the horizontal direction and the number $DY_i$ of cells in the vertical direction which indicate the size of image data. Pixel data of one cell unit has been stored as $S_{11}$ to $S_{ij}$ into the body portion 160.

FIG. 9 shows a storing format of interference fringe data (phase distribution data) which is stored into the image data frame buffer 28 in FIG. 7. Interference fringe data 162 is constructed by a header portion 164 and a body portion 166 in a manner similar to the 2-dimensional image data. Information indicating that the kind of image shows an interference fringe distribution and the number $DX_i$ of cells in the horizontal direction and the number $DY_j$ of cells in the vertical direction which indicate the size of image data are stored in the header portion 164. Address pointers indicative of memory addresses, namely, cell addresses $A_{11}$ to $A_{ij}$ in which interference fringe data of every plurality of pixels constructing each cell has been stored are stored in the body portion 166. Interference fringe data of every pixels constructing one cell has been stored as 1-pixel data in the cell addresses $A_{11}$ to $A_{ij}$, respectively.

Figure 10A:
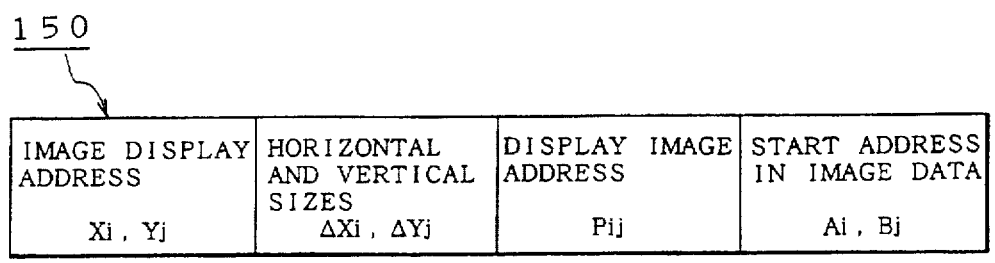
FIGS. 10A and 10B are explanatory diagrams of management data stored in a map for display management.
Figure 10B:
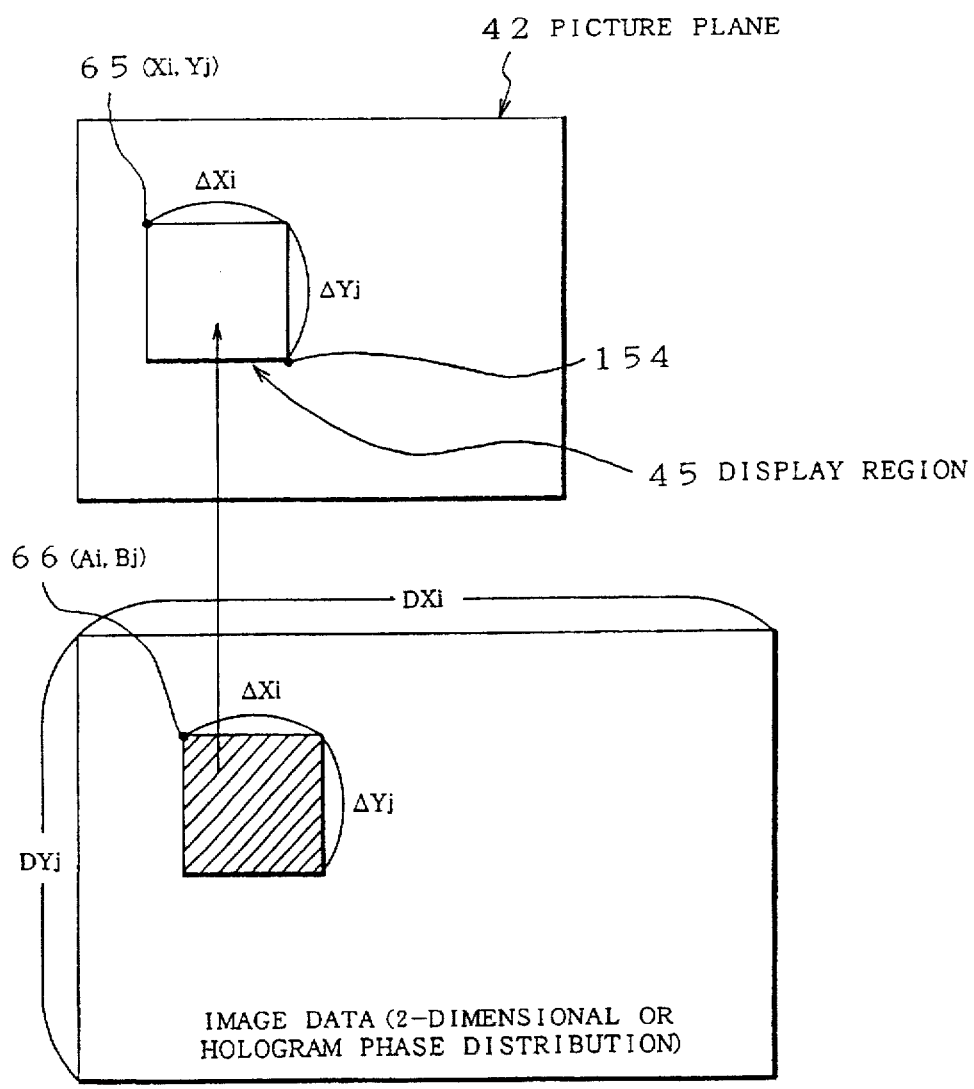

FIG. 10A shows a data format of one management data 150 stored in the map 26 for display management. The management data 150 comprises an image plane display address $(X_i, Y_j)$ indicative of the position of the display region on the image plane, horizontal and vertical sizes $(\Delta X_i, \Delta Y_j)$ of the display region, an address $P_{ij}$ of the image data (2-dimensional image or hologram information) stored in the image data frame buffer 28, and a start address $(A_i, B_j)$ in the image data which is cut out by the region size $(\Delta X_i, \Delta Y_j)$ to actually display an image with respect to the image data in the image data frame buffer 28. As shown in FIG. 10B, the coordinate values of a point 65 at the left upper corner of a display region 45 which is designated in the picture plane 42 are used as an image plane display address $(X_i, Y_j)$. With respect to the horizontal and vertical sizes, a size of region to actually display an image in the display region 45 is designated. The number of cells in the horizontal direction is set to $\Delta X_i$ and the number of cells in the vertical direction is set to $\Delta Y_j$. Further, with respect to the data start address $(A_i, B_j)$ in image, the coordinate values of a point 66 at the left upper corner in the hatched region which is cut out by the size of display region 45 in the display picture plane 42 are used in the image data having the size of $(DX_i \times DY_j)$ of the numbers of cells stored in the image data frame buffer 28. By such a management data 150, it is possible to manage into which region in the display picture plane each image should be allocated.

In the management data 150 in FIG. 10A, although the sizes in the horizontal and vertical directions of the display region are expressed by the numbers of cells, it is also possible to use the coordinate values of an end point 154 at the right lower corner existing on a diagonal line of the end point 65 at the left upper corner. Priorities are set into the management data 150 in order to enable a plurality of images to be selectively displayed in the case where a mode to display a plurality of images in the same region is designated. With respect to the overlapped region, the image of a high priority is displayed. Further, even in the case where a plurality of 2-dimensional images are slightly deviated and are overlappingly displayed and are used as windows, it is sufficient to set the regions in a manner such that a plurality of management data are arranged at the window allocating positions in the map 26 for display management.

Figure 11A:
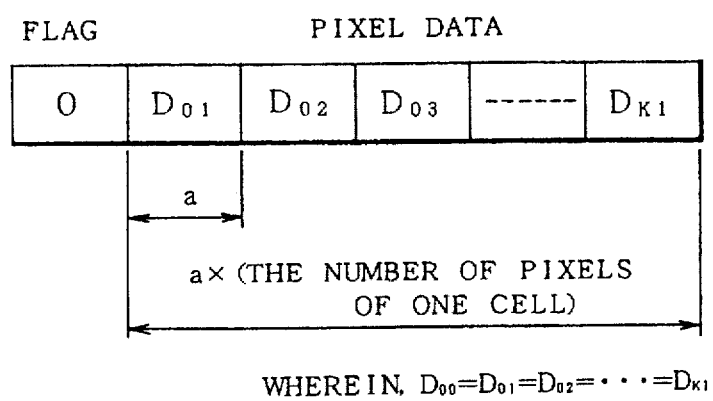
FIGS. 11A and 11B are explanatory diagrams of a data format of cell display data.
Figure 11B:
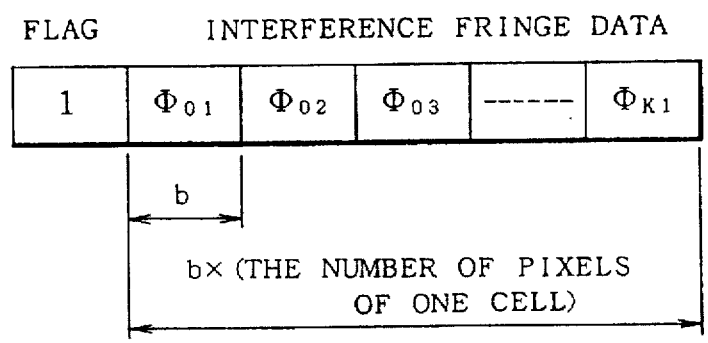

Referring again to FIG. 7, when a command to display both of a 2-dimensional image and a Solid image with respect to a certain picture plane is given, the data managing section 24 refers to the contents of the corresponding image in the map 26 and buffer 28 and produces the display control data regarding the designated image and the display data of the designated image as data of a cell unit and supplies them to the display control section 30. As display control data by the data managing section 24, for instance, now assuming that the designation of the image No. #1 has been given, the display data including an image display address (0,0), horizontal and vertical sizes (1,4), and a start address (0, 1) in the image data is generated. At the same time, on the basis of the data 152-1 corresponding to the image position in the image data frame buffer 28, the data managing section 24 produces the display data on a cell unit basis and supplies them to the display control section 30. The display data of the cell unit which is produced by the data managing section 24 has a data format shown in FIGS. 11A and 11B. FIG. 11A shows the 2-dimensional display data, a flag 0 indicative of a 2-dimensional image is stored into the first portion and, subsequently, pixel data $D_{01}$ to $D_{kl}$ of only the number of pixels constructing one cell are stored. Since one cell as a display unit of a 2-dimensional image is realized as a set of pixels, the same image data is inserted in all of the pixel data $D_{01}$ to $D_{kl}$. Now, assuming that a pixel data length of one pixel is equal to (a), a data length of 2-dimensional display data is equal to (a×the number of pixels of one cell). The number of pixels of one cell is equal to (k×l). FIG. 11B shows a data format of interference fringe display data. A flag 1 indicative of the interference fringe display data is set in the first portion. Subsequent to the flag 1, interference fringe data $\Phi_{01}$ to $\Phi_{kl}$ which are displayed by the pixels of one cell are set. A length of interference display data is equal to the length which is obtained by multiplying the number of pixels of one cell to a data length (b) per one pixel.

Figure 12A:
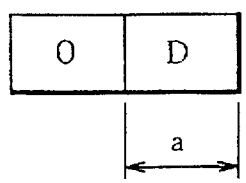
FIGS. 12A and 12B are explanatory diagrams of another data format of cell display data.
Figure 12B:
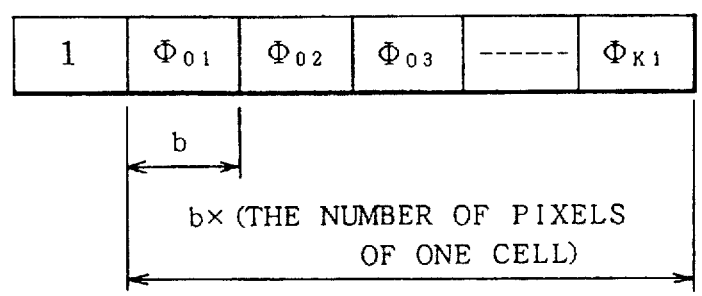

FIGS. 12A and 12B show another data format of display data of a cell unit which is produced by the data managing section 24. Since each image data of a plurality of pixels constructing one cell is the same data with respect to the 2-dimensional display data of FIG. 12A, only pixel data D of one pixel is set after the flag 0, so that a length of 2-dimensional display data can be reduced. Interference fringe data of FIG. 12B has substantially the same data format as that of FIG. 11B.

Figure 13A:
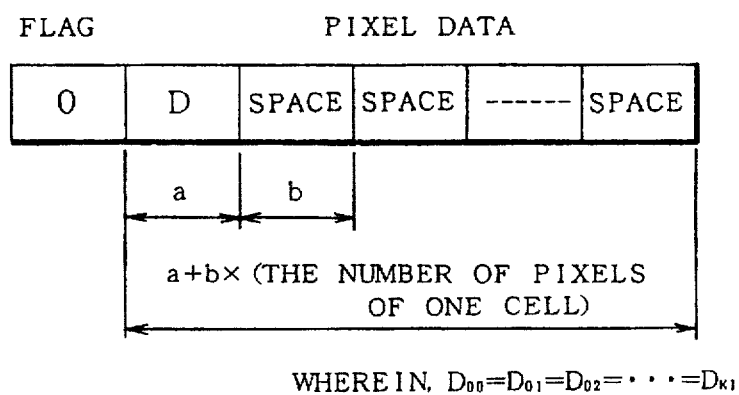
FIGS. 13A and 13B are explanatory diagrams of another data format of cell display data.
Figure 13B:
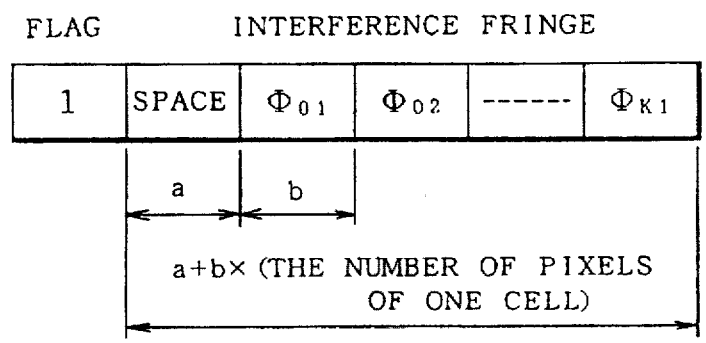

FIGS. 13A and 13B show another data format of display data which is produced on a cell unit basis. This data format is characterized in that a data format of 2-dimensional display data of FIG. 13A is equal to a data format of interference fringe display data of FIG. 13B. That is, each of the data shown in FIGS. 13A and 13B is similarly constructed using a flag region, an image data region for a 2-dimensional image, and an interference fringe data region of a plurality of pixels constructing one cell. A value which is obtained by increasing a data length (b) of the pixel data for interference fringe display by the number of times corresponding to the number of pixels of one cell is added to pixel data (a) for the 2-dimensional image, and a resultant value is set to a data length. With regard to the 2-dimensional display data, the head flag is set to 0 and a fact that the pixel data D which is used in the next 2-dimensional image display is effective data is shown by the flag 0. A memory area of the subsequent interference fringe data is set to a space area. On the other hand, with respect to the interference fringe display data, by setting the flag into 1, it is shown that the pixel area of the next 2-dimensional image data is a space area and that the subsequent interference fringe data $\Phi_{01}$ to $\Phi_{kl}$ are effective data.

The data format shown in FIGS. 11A and 11B relates to a method of sequentially supplying the pixel data to the pixels constructing one cell and displaying and driving and can simplify the display control. With respect to the data format of FIGS. 12A and 12B, although the data format of the interference fringe display data is substantially the same as that of FIG. 11B, in case of the 2-dimensional display data, only the data of one pixel is transmitted for display of one cell and all of the pixels constructing one cell are displayed and driven in a lump by one pixel data, so that the display control can be performed at a high speed. Further, in the data format of FIGS. 13A and 13B, since the 2-dimensional image data and the interference fringe display data have the same data format, there is an advantage such that the data can be commonly handled in the display control. In the data format of FIGS. 13A and 13B, all of the data have the data length as much as the number of pixels of one cell. In case of displaying a 2-dimensional image, a vain data region exists. However, there is a larger advantage on the display driving because the 2-dimensional display and the interference fringe display have the same data format.

Figure 14:
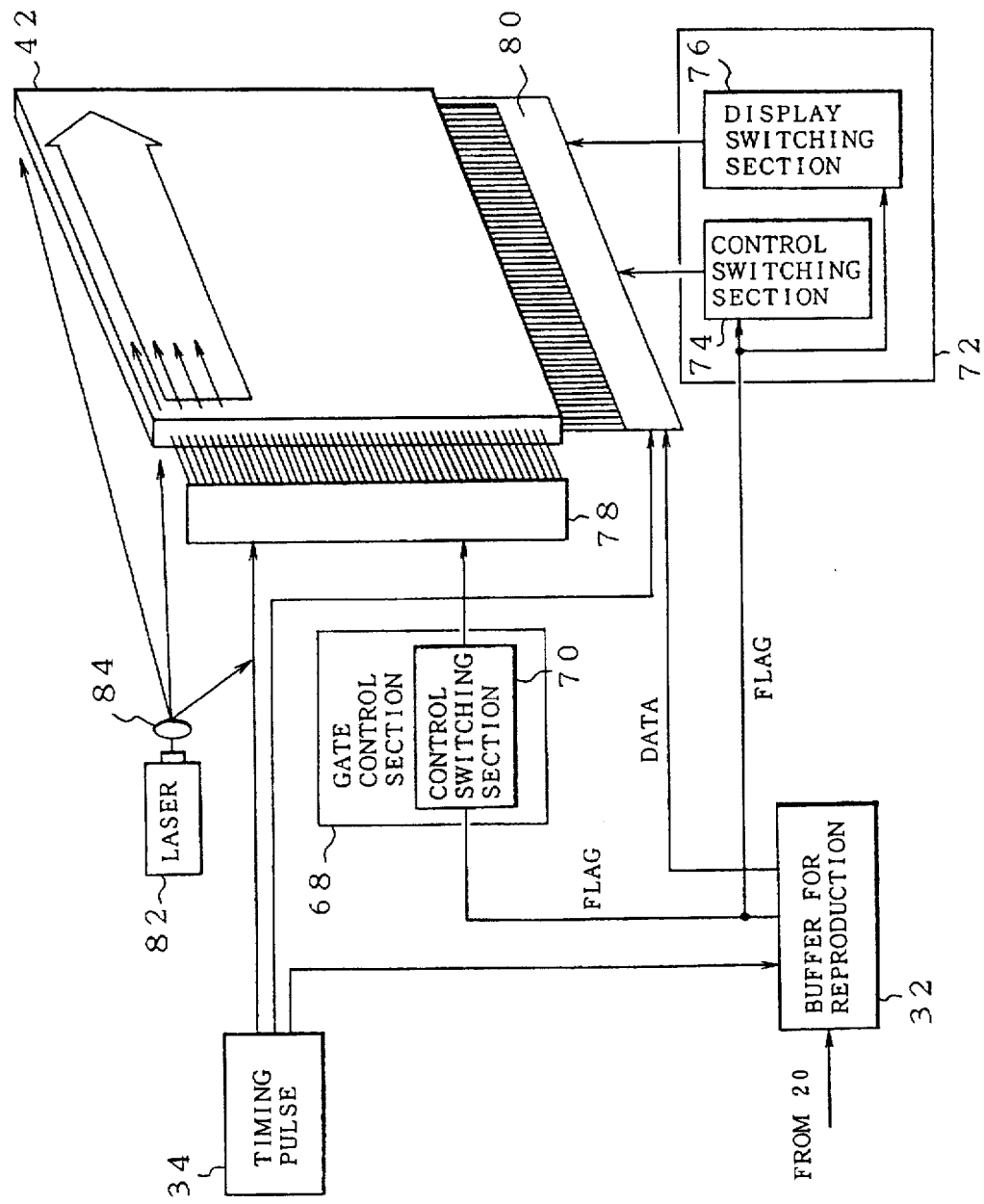
FIG. 14 is an explanatory diagram showing an embodiment of a display control section in FIG. 2.

FIG. 14 shows the details of the display control section 30 shown in FIG. 1 together with the display panel 42. The 2-dimensional display data and interference fringe display data which are displayed on the display panel 42 are supplied from the display data forming section 20 on a cell unit basis together with the corresponding display control data and stored. The display panel 42 has a driving circuit 78 in the vertical direction and a driving circuit 80 in the horizontal direction. The driving circuit 78 drives, for example, address lines in the horizontal direction. The driving circuit 80 supplies a display driving signal based on the display data to signal lines in the vertical direction. A gate control section 68 having a control switching section 70 is provided for the driving circuit 78. A data control section 72 having a control switching section 74 and a display switching section 76 is provided for the driving circuit 80. Each of the control switching section 70 and 74 of the data control sections 68 and 72 selects the cells to be displayed on the basis of the data which has been stored in the buffer 32 for reproduction and indicates the display region of each image. Specifically speaking, the control switching section 70 selects the cells arranged in the horizontal direction as one unit. The cells existing at the intersecting positions in the horizontal and vertical directions selected by both of the control switching sections 70 and 74 are selected as cells to be displayed. The display switching section 76 provided in the data control section 72 switches a display mode into a mode to supply the display driving signal to a plurality of pixels included in the cells selected as display targets by the control switching sections 70 and 74. In case of the 2-dimensional image display, in the data format of FIGS. 11A and 11B, the display driving signals are sequentially supplied every pixel. In the data formats of FIGS. 12A and 12B and FIGS. 13A and 13B, the same display driving signal is supplied in parallel in a lump to all of the pixels in the cell. With regard to the display of the interference fringe, an interference fringe signal which is peculiar to each pixel constructing the cell is supplied to the cells selected by the control switching sections 70 and 74. When the cells are selected by the timing pulses from the timing pulse generating section 34, the cells are sequentially selected in the horizontal direction from the cell at the left upper corner in the display panel 42 and are displayed. When the display position reaches the right end of the line, it is returned to the left end of the line which is lower by one line. In a manner similar to the above, the above operations are repeated up to the right end of the lowest line. The scanning operation such that after completion of the display control for one image plane, the display is again returned to the original cell at the left upper corner is repeated. Further, the buffers 32 for reproduction and the data control sections 72 of the number corresponding to the number of cells in the horizontal direction in the display panel 42 are provided and the processes are executed in parallel. By this construction, the scanning and display operations can be sequentially executed for every cells arranged in the horizontal direction of the display panel 42, so that the pixels can be displayed at a higher speed. In FIG. 14, further, a laser light source 82 is provided behind the display panel 42. A laser beam from the laser light source 82 is diffused by a collimating lens 84 and are irradiated to the rear surface of the display panel 42 as a reference light for stereoscopic display and a transmission illuminating light for 2-dimensional image display.

Figure 15:
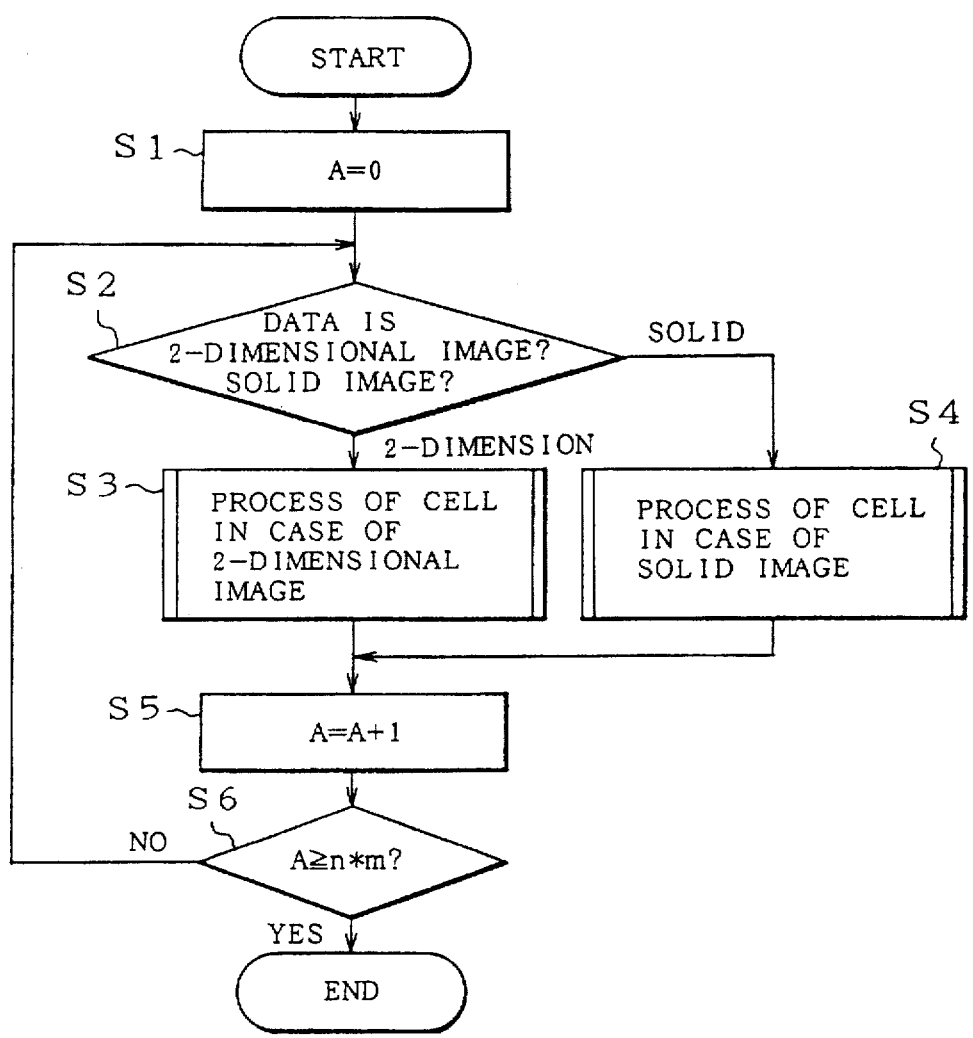
FIG. 15 is a flowchart showing the display control in FIG. 14.
Figure 16:
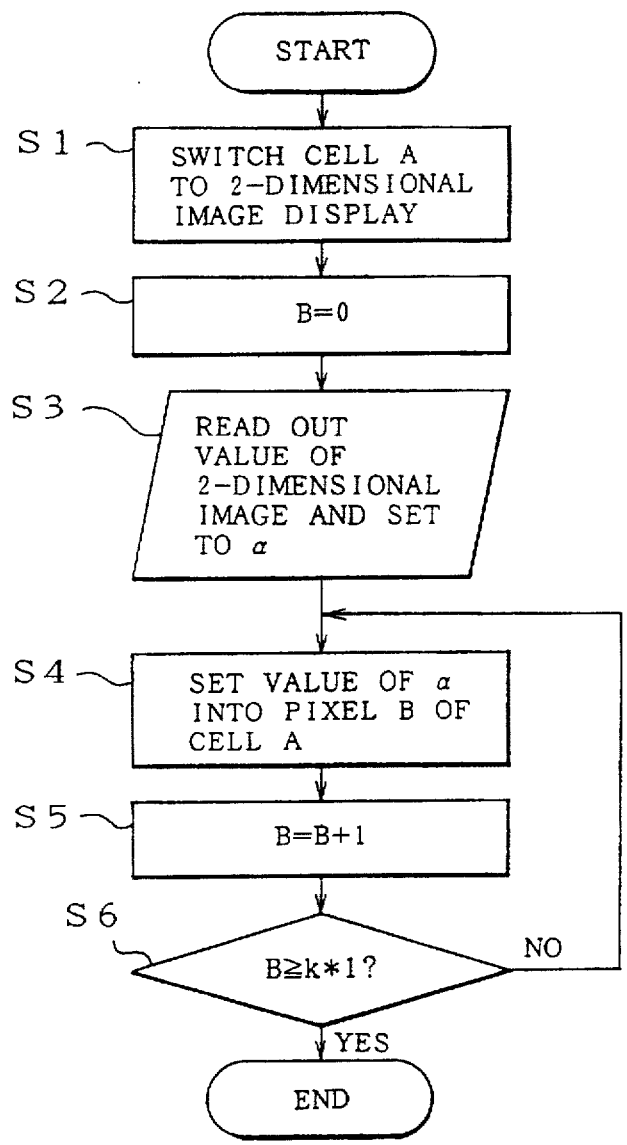
FIG. 16 is a flowchart showing a cell display process of a 2-dimensional image in FIG. 15.

A flowchart of FIG. 15 shows a processing procedure for the display control shown in FIG. 14. First, in step S1, a counter (A) indicative of the number of cells on the image plane is reset to A=0. In step S2, a check is made to see if the first data is a 2-dimensional image or a solid image. In case of the 2-dimensional image, step S3 follows and the cell process for the 2-dimensional image is executed. In case of a solid image (3-dimensional image), step S4 follows and the cell process for the solid image is executed. In step S5, the count value of the cell counter (A) is increased by 1 and a check is made in step S6 to see if the count value of the counter reaches the total number (n×m) of cells or not. The processes in steps S2 to S6 are repeated until the count value reaches the total number of cells. When the count value reaches the total number of cells, the above series of processes are finished. A flowchart of FIG. 16 shows in detail the cell process in case of the 2-dimensional image in step S3 in FIG. 15 with respect to the case where the data format of FIG. 11A is used as a format of the 2-dimensional display data. In step S1 in FIG. 16, a display mode of the cell (A) which is designated by the cell counter (A) is switched to the display mode of the 2-dimensional image. In step S2, a pixel counter (B) indicative of the number of pixels in one cell is reset to B=0. In step S3, the value of the 2-dimensional image is read out and set into $\alpha$. In step S4, the image value $\alpha$ is set into the pixel (B) of the cell (A). In step S5, the count value of the counter (B) is increased by 1. Until the count value of the counter (B) reaches the total number (k×l) of pixels in step S6, the processes in steps S4 to S6 are repeated.

Figure 17:
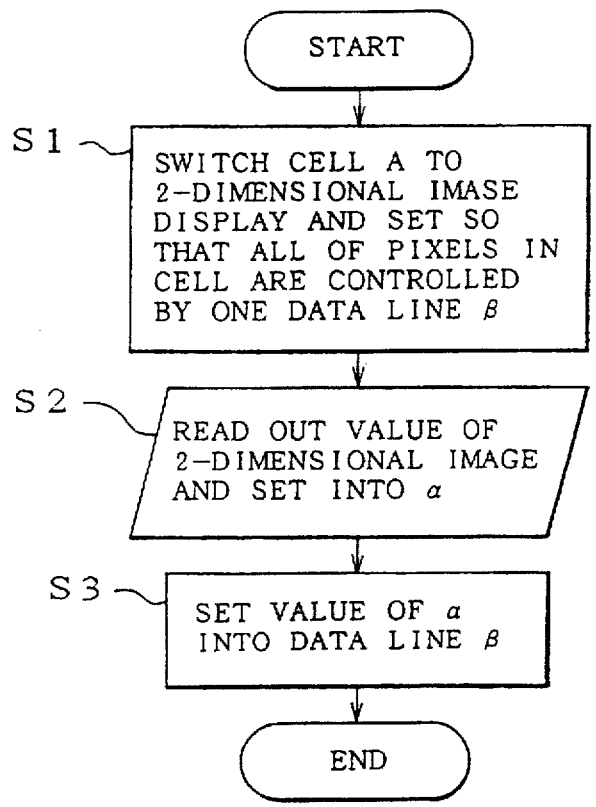
FIG. 17 is a flowchart showing another cell display process of the 2-dimensional image in FIG. 15.

A flowchart of FIG. 17 shows the process of the cell in case of the 2-dimensional image in step S3 in FIG. 15 with respect to the data formats shown in FIGS. 12A and 13A. In step S1 in FIG. 17, the cell (A) designated by the cell counter (A) is switched to the 2-dimensional image display mode by the display switching section and the display control mode is set by the display switching section in a manner such that all of the pixels in the cell are controlled by one data line $\beta$. In step S2, the value of the 2-dimensional image is read out and set into $\alpha$. In step S3, the image value a is set into the data line $\beta$.

Figure 18:
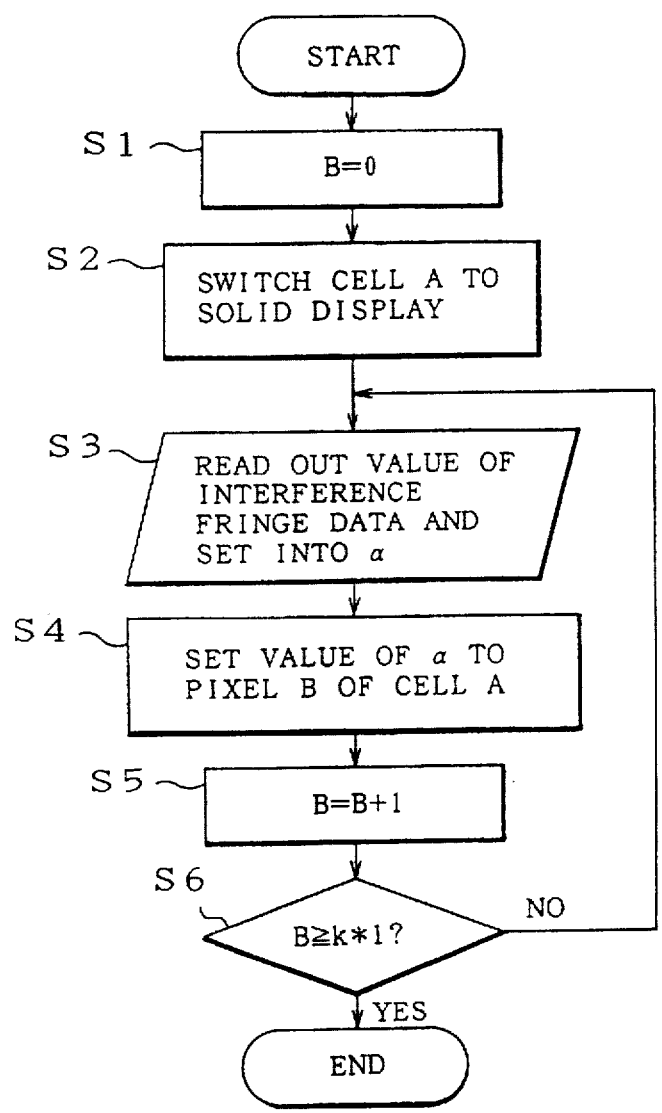
FIG. 18 is a flowchart showing a cell display process of a solid image in FIG. 15.

A flowchart of FIG. 18 shows the details of the cell process in case of the stereoscopic display in step S4 in FIG. 15. This cell process is executed in any of the data formats shown in FIGS. 11B, 12B, and 13B. First, in step S1, the pixel counter (B) is reset to B=0. In step S2, the cell (A) designated by the cell counter (A) is switched to the 3-dimensional display mode. In step S3, the value of the interference fringe data is read out and set into $\alpha$. In step S4, the interference fringe data value $\alpha$ is set into the pixel (B) of the cell (A). In step S5, the count value of the pixel counter (B) is increased by 1. Until the count value reaches the total number (k×l) of pixels, the setting operation of the interference fringe data value is repeated every pixel.

Figure 19:
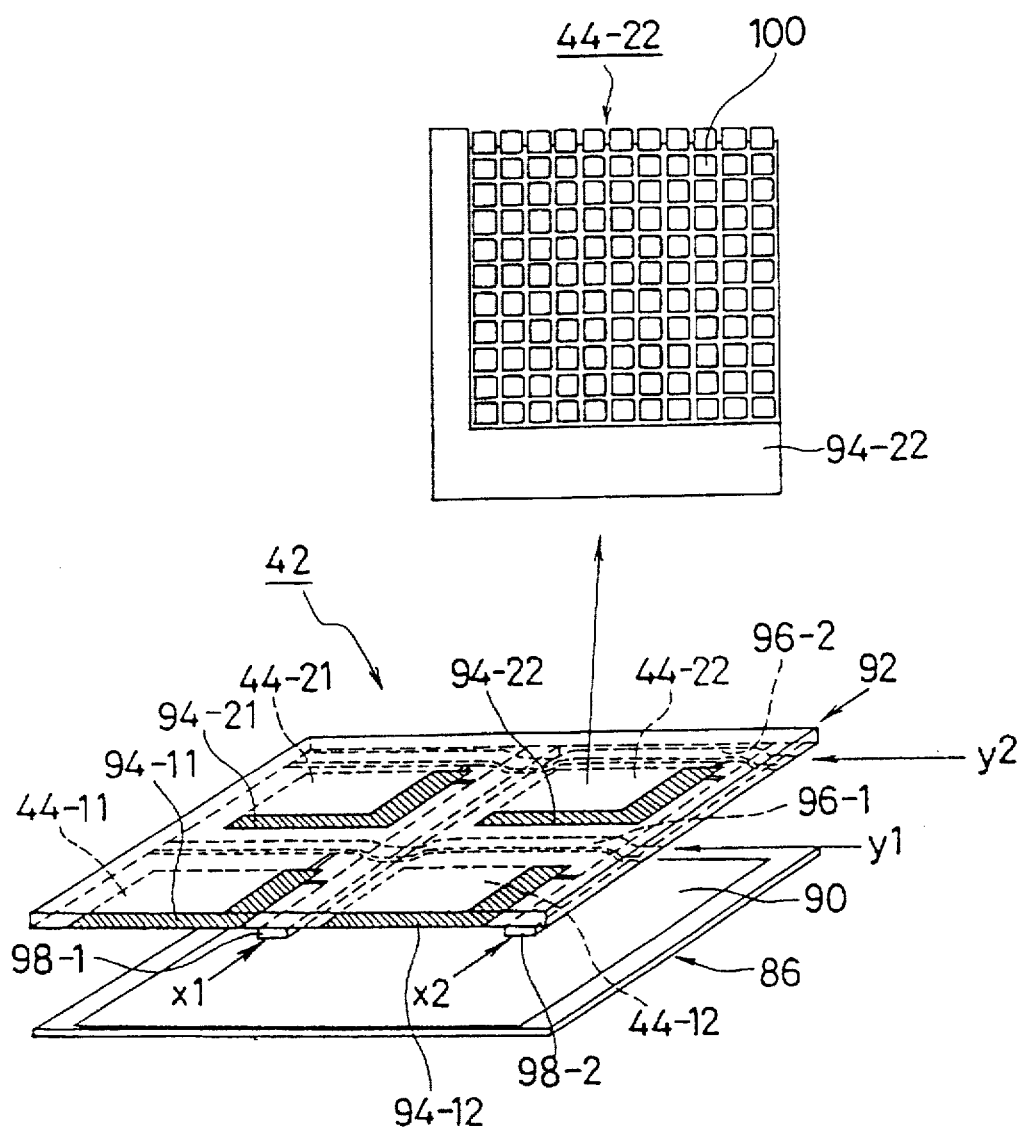
FIG. 19 is an explanatory diagram showing a structure with respect to four cells of a display section in FIG. 3.

A detailed structure of the display panel 42 which is used in the invention shown in FIG. 2 will now be described. FIG. 19 shows a detailed structure of the display panel 42 in the invention with respect to four cells. In the display panel 42, a common electrode 90 is provided on the inside of a glass substrate 86 on the lower side. Cell electrode sections 44-11 to 44-22 are formed on the inside of a glass substrate 92 on the upper side. As for the cell electrode sections 44-11 to 44-22, as typically shown in the cell electrode section 44-22, micro pixel electrodes 100 constructing the pixel are two-dimensionally arranged. L-shaped driving circuit sections 94-11 to 94-22 are formed in the cell electrode sections 44-11 to 44-22 on the glass substrate 92. Further, address lines 98-1 and 98-2 indicated by $x_1$ and $x_2$ and signal lines 96-1 and 96-2 of the number corresponding to the number of pixel electrodes 100 shown by $y_1$ and $y_2$ are arranged for the glass substrate 92, respectively. A liquid crystal is arranged and sealed between the glass substrates 86 and 92 in a form such that the liquid crystal is sandwiched by upper and lower deflecting plates, so that a structure of a liquid crystal display panel can be realized.

Figure 20A:
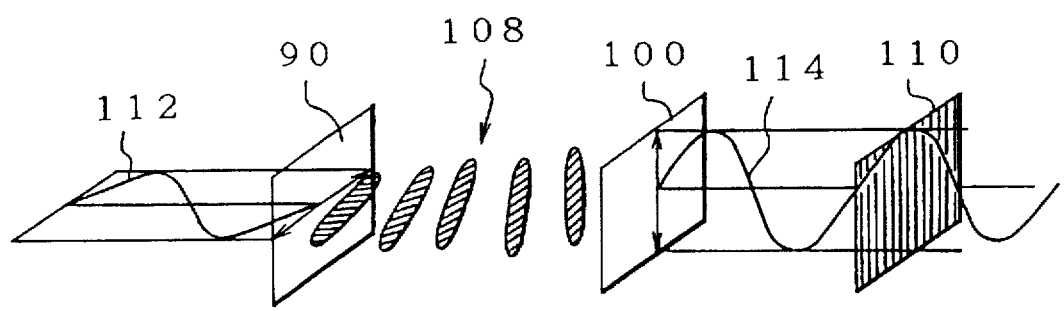
FIGS. 20A and 20B are explanatory diagram of the operation of a liquid crystal display device using a TN liquid crystal.
Figure 20B:
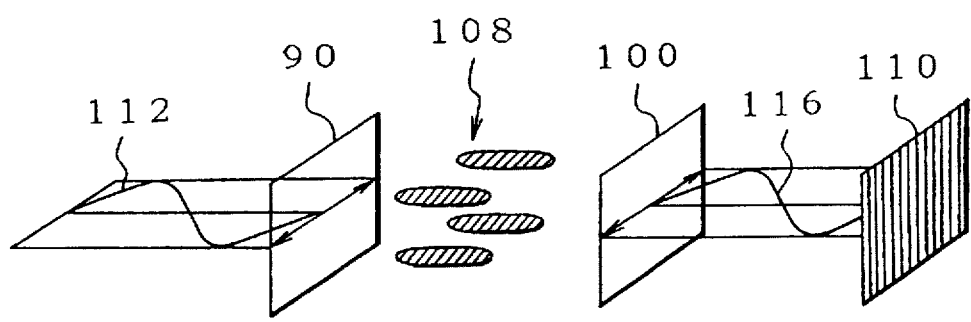

FIGS. 20A and 20B show the light modulating function in case of using a TN liquid crystal as a liquid crystal display device of the display panel 42 shown in FIG. 19. FIG. 20A shows a state in which no driving voltage is applied between the electrodes 90 and 100. In this instance, an orientation direction of a liquid crystal 108 is changed by 90° for an interval from the electrode 90 to the electrode 100. Therefore, the direction of an incident light 112 is rotated by 90° by the liquid crystal 108 and is generated as a modulation light 114 and is emitted through a deflecting plate 110, so that the light is transmitted. FIG. 20B shows a state in the case where the driving voltage was applied between the electrodes 90 and 100. By changing the voltage which is applied between the electrodes, a light transmittance can be controlled. In the invention, a number of such liquid crystal display devices are arranged as pixels on the display panel. The light transmittance is controlled on a pixel unit basis and an interference fringe distribution is displayed by the amplitude modulation. A 2-dimensional image can be displayed by a change due to the transmittance.

Figure 21A:
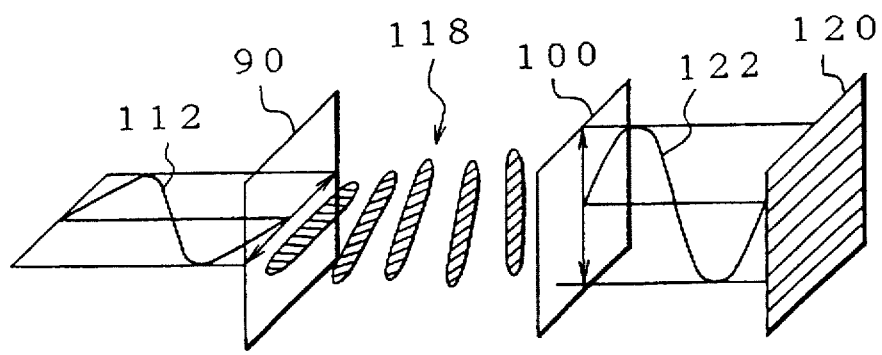
FIGS. 21A and 21B are explanatory diagrams of the operation of a liquid crystal display device in which a phase and an amplitude can be independently controlled by a driving voltage.
Figure 21B:
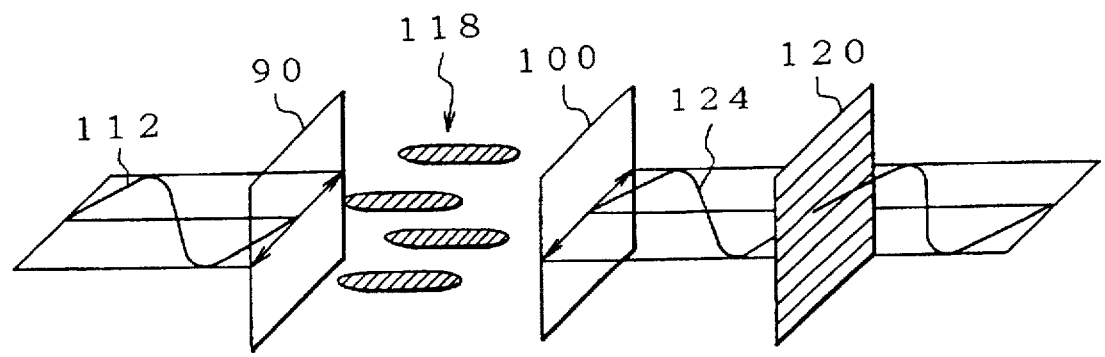
Figure 22:
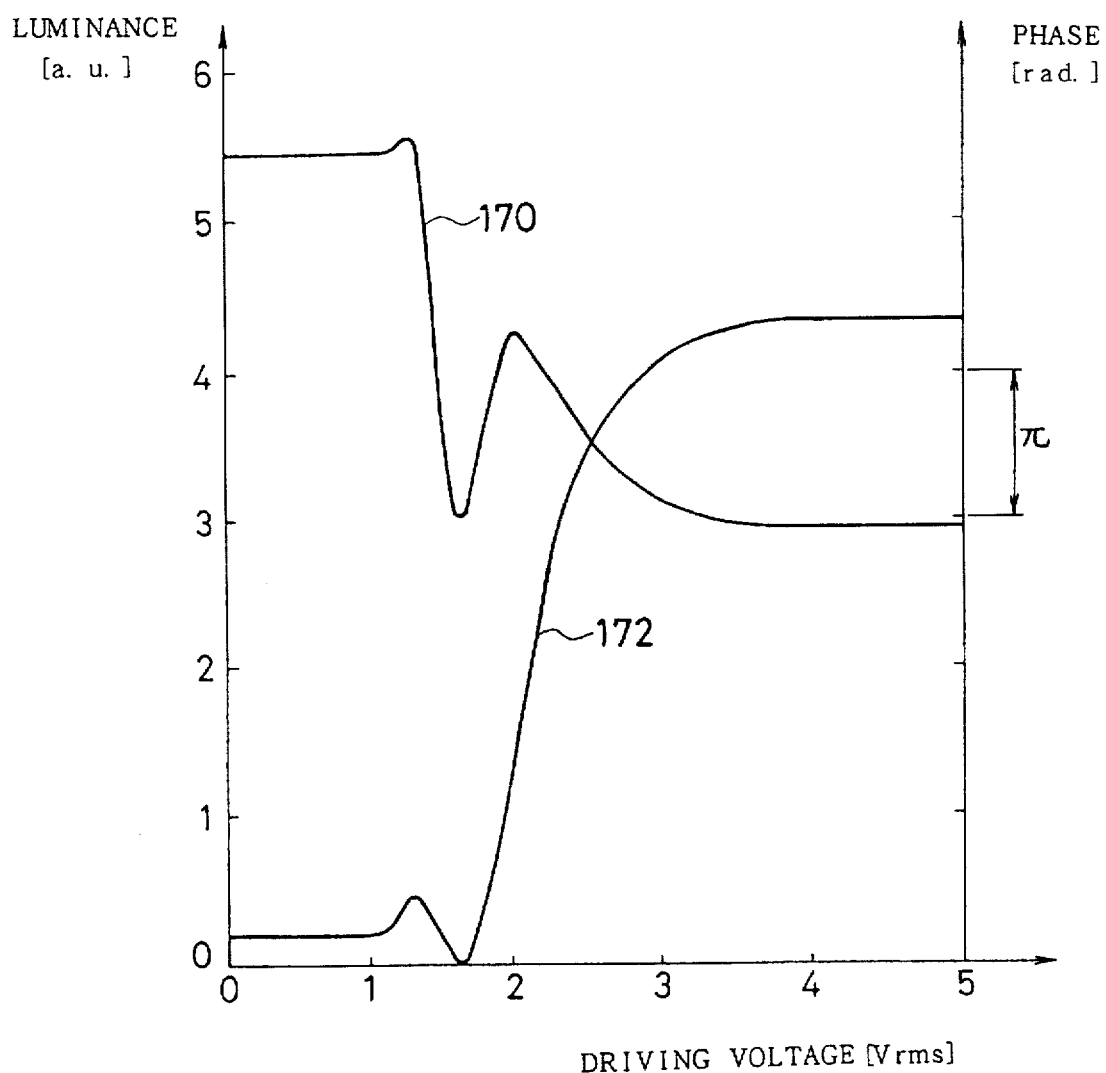
FIG. 22 is an explanatory diagram of phase characteristics and amplitude characteristics for the driving voltage of the liquid crystal display device in FIG. 21.
Figure 23:
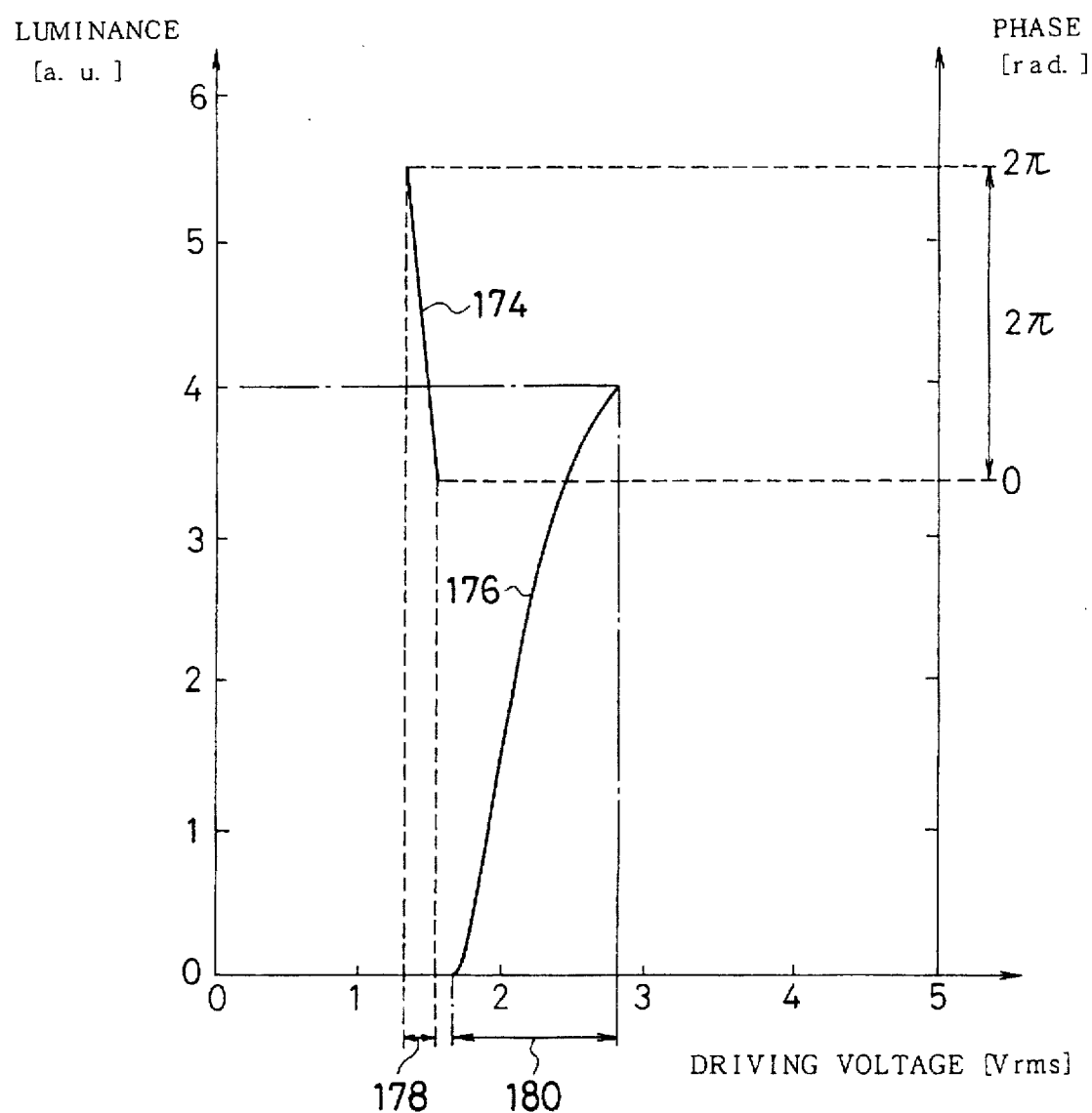
FIG. 23 is an explanatory diagram showing phase characteristics and amplitude characteristics which are used in the invention.

FIGS. 21A and 21B show the operation of a liquid crystal display device in which an amplitude modulation and a phase modulation can be independently controlled by changing a range of the voltage which is applied to the liquid crystal display device (refer to "Optics Letters", Vol. 13, No. 3, pages 251 to 253, March, 1988). FIG. 21A shows a state in which no voltage is applied between the electrodes 90 and 100 and a plate which can pass the polarized light in the horizontal direction is used as a deflecting plate 120. Therefore, although the deflecting direction of the incident light 112 is rotated by 90° and the incident light 112 becomes an output light 122, the passage of the light is shut out by the deflecting plate 120. FIG. 21B shows a state in which the driving voltage was applied between the electrodes 90 and 100. In this state, the deflecting direction of an output light 124 changes and the light passes through the deflecting plate 120. By changing the voltage which is applied between the electrodes 90 and 100, characteristics 170 regarding the phase and characteristics 172 regarding the luminance as shown in FIG. 22 can be obtained. FIG. 22 shows a phase axis on the right side and one scale shows a change in $\pi$. Therefore, with regard to the phase characteristics 170, a portion of the phase characteristics 170 in which a phase change of $2\pi$ is obtained is extracted as phase characteristics 174 as shown in FIG. 23. On the other hand, luminance characteristics 176 in a range of the luminances of 0 to 4.5 [a.u.] in the luminance characteristics 172 in FIG. 22 are extracted as shown in FIG. 23. Ranges of the driving voltages for the phase characteristics 174 and luminance characteristics 176 are different as shown by reference numerals 178 and 180. Therefore, on the basis of the phase characteristics 174 shown in FIG. 23, a conversion table of the driving voltage to the phase data and a conversion table of the driving voltage to the luminance data are formed and are provided as converting circuits for the driving circuit 80 of the liquid crystal display 42 shown in FIG. 14. Due to this, on the basis of the interference fringe data (phase data) and image data (luminance data) which are given as data, the switching display between the solid image and the 2-dimensional image can be executed by the interference fringe display.

Figure 24:
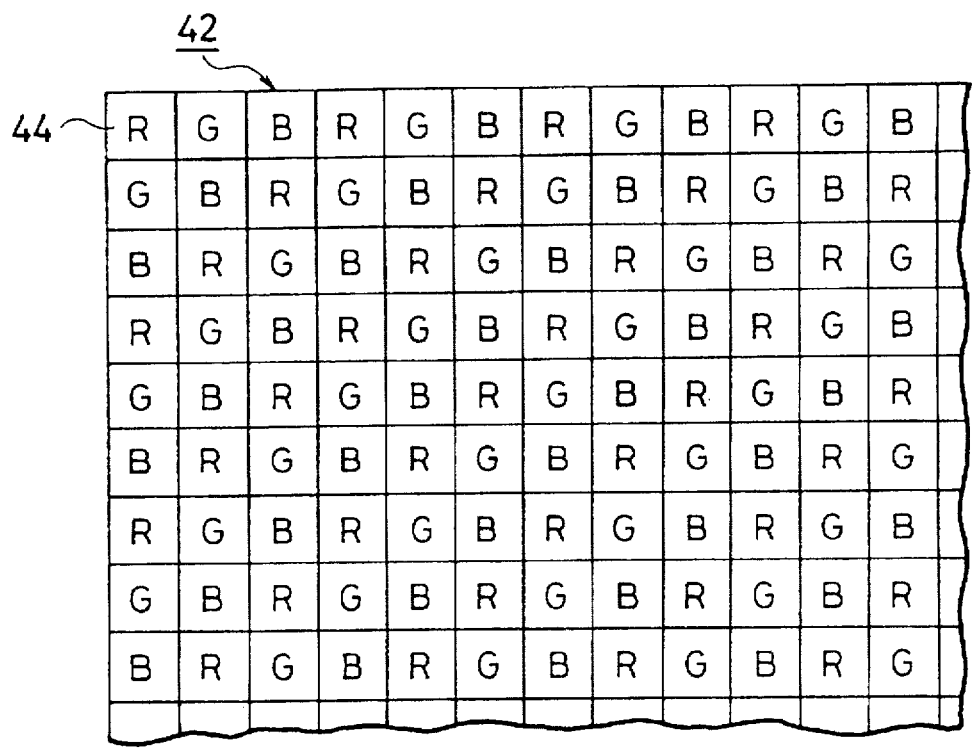
FIG. 24 is an explanatory diagram of a color display by the space division.

FIG. 24 shows a process to form a color image in the display apparatus of the invention. Color filters of RGB are attached every cell 44 of the display panel 42. Interference fringe data or 2-dimensional image data according to the color of each cell are displayed, and a white laser is used as an illuminating light, so that a color image can be displayed.

Figure 25:
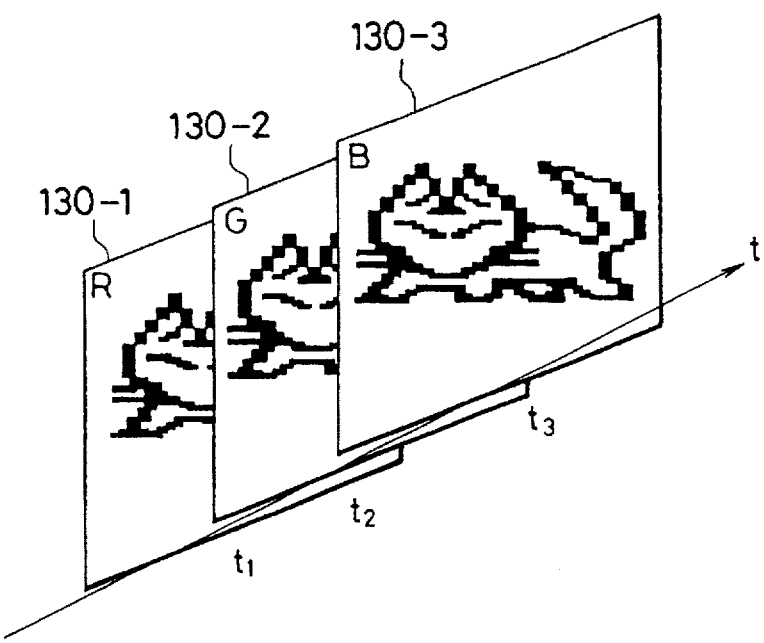
FIG. 25 is an explanatory diagram of a color display by the time division.

As shown in FIG. 25, on the other hand, an R component image 130-1, a G component image 130-2, and a B component image 130-3 are sequentially displayed every times $t_1$, $t_2$, and $t_3$ and laser beams corresponding to the R, G, and B components are sequentially illuminated, so that a color image can be realized.

According to the invention as mentioned above, both of a solid image and an ordinary 2-dimensional image can be simultaneously displayed by using one display panel. A set of pixels to display hologram information is handled as a cell as one pixel in a 2-dimensional image. The display of the 2-dimensional image and the display of the solid image are executed on a cell unit basis, so that the display controls of the 2-dimensional image and the solid image can be integratedly handled. The construction of the apparatus can be simplified and can be efficiently displayed.

Although the above embodiments have been described with respect to the display of a still image which is fixedly displayed every image plane as an example, by time-sequentially preparing the 2-dimensional image information and the hologram information, an animation can be also obviously displayed. The invention is not limited to the above preferred embodiments but many variations and modifications are possible. Further, the invention is not limited to the numerical values shown in the embodiments.

What is claimed is:

1. A display apparatus comprising:
    display means for displaying a 2-dimensional graphical image and hologram information, said display means comprising a display image plane arranged with a plurality of cells displaying the 2-dimensional graphical image, each cell including a plurality of pixels displaying the hologram information, said 2-dimensional graphical image being based on 2-dimensional display data, and said hologram information being based on hologram display data;
    display data forming means for producing the 2-dimensional display data and the hologram display data together with corresponding display control data; and
    display control means for controlling said display means using the 2-dimensional display data and the hologram display data produced by said display data forming means.

2. The display apparatus according to claim 1, further comprising input means for inputting 2-dimensional image information to display the 2-dimensional graphical image and the hologram information together with an image data size indicative of a size of the 2-dimensional image information and the hologram information.

3. An apparatus according to claim 1, wherein said display data forming means comprises:
    display data memory means for storing 2-dimensional image information to display the 2-dimensional graphical image and said hologram information together with each image size for every image;

control data memory means for storing the display control data indicative of at least a display position of said 2-dimensional image information and said hologram information which were separated for the every image; and data managing means for producing 2-dimensional display data and hologram display data of a predetermined display unit by reading out the 2-dimensional image information and hologram information from said display data memory means and for generating the 2-dimensional display data and the hologram display data together with the display control data indicative of the display position read out from the control data memory means.

4. An apparatus according to claim 3, wherein, for the every image, the display control data stored in the control data memory means comprises:
   each of a position of a display region on the display image plane,
   a size of said display region,
   image designation information to designate the image data in said display data memory means, and
   a cutting-out position in the image data for cutting out the image data designated by the image designation information by the display region size and allowing the image data to be displayed in the display region.

5. An apparatus according to claim 4 wherein said control data memory means comprises:
   coordinates of at least one point in a rectangular display region which is set into the display image plane as said display position,
   the numbers of cells in horizontal and vertical directions as a size of said display region, and
   coordinates of at least one point in a rectangular cut-out region as a cutting-out position in the image data.

6. An apparatus according to claim 4, wherein said control data memory means comprises:
   coordinates of at least one point in a rectangular display region which is set in the display image plane as said display position, and
   coordinates of another one point existing on a diagonal line of said one point indicative of the display position as a size of said display region.

7. An apparatus according to claim 3, wherein said control data memory means comprises:
   a. priority which has been preset for the every image, and wherein if a mode to display a plurality of images into one region is designated, said data managing means produces the display control data and the display data of the image having high priority stored in the control data memory means and corresponding to the display control data.

8. An apparatus according to claim 7, wherein said data managing means determines an overlapping state of the regions on a cell unit basis and produces the display control data and the display data of the image having the high priority and corresponding to the display control data.

9. An apparatus according to claim 3, wherein said data managing means produces 2-dimensional display data and hologram display data for each cell unit.

10. An apparatus according to claim 9, wherein a cell comprises a plurality of pixels and said data managing means produces 2-dimensional display data in which each data of the plurality of pixels of the cell are equivalent to each other.

11. An apparatus according to claim 10, wherein the each data of said plurality of pixels of the cell are equivalent to each other.

12. An apparatus according to claim 9, wherein said data managing means produces data of only one pixel in said plurality of pixels of the cell as 2-dimensional display data.

13. An apparatus according to claim 9, wherein said data managing means produces hologram display data in which each hologram information of said plurality of pixels of the cell is set to the one group.

14. An apparatus according to claim 9, wherein said data managing means produces 2-dimensional information of only one pixel as said 2-dimensional display data, produces hologram information in which each value of said plurality of pixels of the cell is set to the one group as said hologram display data, and produces said 2-dimensional display data and said hologram display data by a data format.

15. An apparatus according to claim 9, wherein said data managing means further generates flag information corresponding to the 2-dimensional information and the hologram information.

16. An apparatus according to claim 1, wherein said display means comprises:
   an amplitude display changing an amplitude of light, and
   a phase display changing a phase of light, wherein the amplitude display and the phase display are switched and displayed based on a display driving signal, and said display control means executes switching control to amplitude display the 2-dimensional display data on the display means and to phase display the hologram display data on the display means.

17. An apparatus according to claim 16, wherein said display control means switches the amplitude display and the phase display on for each cell unit.

18. An apparatus according to claim 16, wherein said display control means switches the amplitude display and the phase display by a change in a driving voltage supplied to the display means.

19. An apparatus according to claim 16, wherein said display control means executes the amplitude display in a lump for the pixels in a cell.

20. An apparatus according to claim 19, wherein said display control means simultaneously applies a voltage to all of the pixels in a cell and executes the amplitude display in a lump.

21. An apparatus according to claim 16, wherein said display means comprises:
   a TN liquid crystal oriented in first, horizontal direction for an image plane, and
   a deflecting device light deflecting in the first, horizontal direction, for switching the amplitude display and the phase display.

22. An apparatus according to claim 1, wherein said display means comprises light source means for changing a light intensity by an amplitude display by the 2-dimensional display data displaying the 2-dimensional image and converting a light into a wave front by a phase display by the hologram display data, thereby allowing a solid image to be recognized.

23. An apparatus according to claim 1, wherein color components of the 2-dimensional graphical image are time-divisionally displayed on the display means, thereby displaying a color image.

24. An apparatus according to claim 1, wherein a plurality of color components of the 2-dimensional graphical image are spatially separately arranged for every cell of the display means, thereby displaying a color image.

* * * * *

UNITED STATES PATENT AND TRADEMARK OFFICE
CERTIFICATE OF CORRECTION

PATENT NO. : 5,739,930

DATED : April 14, 1998

INVENTOR(S) : Sato et al.

It is certified that error appears in the above-identified patent and that said Letters Patent is hereby corrected as shown below:

Col. 1, line 17, "shape" should be --shape,--;
line 24, delete "the";
line 38, "information" should be --information,--;
line 46, "image" should be --image,--;
line 52, "large" should be --large. Further,--;

Col. 2, line 13, delete ":";
line 15, change ";" to --,--.

Col. 4, line 39, "dimensional" should be --2-dimensional--.

Col. 5, line 25, "3" should be --j--;
line 31, "1=1" should be --$\ell$=1--;
line 51, "R.O" should be --R·O--.

Col. 7, line 55, "Solid" should be --solid--.

Col. 8, lines 8, 12, 15, 19 and 54, "1" should be --$\ell$--.

Col. 10, lines 33 and 57, "1" should be --$\ell$--.

Col. 13, line 45, delete ".".

UNITED STATES PATENT AND TRADEMARK OFFICE
CERTIFICATE OF CORRECTION

PATENT NO. : 5,739,930
DATED : April 14, 1998
INVENTOR(S) : Sato, et. al.

It is certified that error appears in the above-indentified patent and that said Letters Patent is hereby corrected as shown below:

Col. 14, line 46, after "in" insert --a--.

Signed and Sealed this

Twenty-eighth Day of July, 1998

Attest:

BRUCE LEHMAN

Attesting Officer

Commissioner of Patents and Trademarks